US011204119B2

(12) United States Patent
Weiss

(10) Patent No.: US 11,204,119 B2
(45) Date of Patent: Dec. 21, 2021

(54) CONNECTION DEVICE FOR A FLUID LINE AND CORRESPONDING ASSEMBLY METHOD

(71) Applicant: Festo SE & Co. KG, Esslingen (DE)

(72) Inventor: Martin Weiss, Göppingen (DE)

(73) Assignee: FESTO SE & CO. KG, Esslingen (DE)

( * ) Notice: Subject to any disclaimer, the term of this patent is extended or adjusted under 35 U.S.C. 154(b) by 288 days.

(21) Appl. No.: 16/468,600

(22) PCT Filed: Nov. 14, 2017

(86) PCT No.: PCT/EP2017/079110
§ 371 (c)(1),
(2) Date: Jun. 11, 2019

(87) PCT Pub. No.: WO2018/108407
PCT Pub. Date: Jun. 21, 2018

(65) Prior Publication Data
US 2020/0080676 A1  Mar. 12, 2020

(30) Foreign Application Priority Data
Dec. 12, 2016 (DE) ...................... 10 2016 224 730.1

(51) Int. Cl.
*F16L 37/091* (2006.01)
(52) U.S. Cl.
CPC ................ *F16L 37/0915* (2016.05)
(58) Field of Classification Search
CPC . F16L 15/04; F16L 15/06; F16L 19/08; F16L 19/083; F16L 19/086; F16L 37/091; F16L 37/0915; F16L 37/0925

USPC ......... 285/39, 108, 104, 219, 220, 307, 340, 285/390
See application file for complete search history.

(56) References Cited

U.S. PATENT DOCUMENTS 2,788,045 A * 4/1957 Rosan ...................... F16B 39/32
411/277
7,980,602 B2 * 7/2011 Charlson .................. F16L 47/20
285/382
8,201,855 B2 * 6/2012 Larsson ................... F16L 15/08
285/390

(Continued)

FOREIGN PATENT DOCUMENTS

| CN | 103732969 A | 4/2014 |
| DE | 2622330 A1 | 12/1976 |
| DE | 20010329 U1 | 11/2000 |

(Continued)

*Primary Examiner* — Aaron M Dunwoody
(74) *Attorney, Agent, or Firm* — Hoffmann & Baron, LLP

(57) ABSTRACT

A connection device for a fluid line, which has a connection unit that can be fixed in an internally threaded fastening opening of a carrier component by means of an externally threaded section of a fastening element, said threaded section consisting of a rubber elastic material. An insertion opening extends through the connection unit and the fluid line to be connected can be inserted therein so that it projects through an annular retaining element fixed in the fastening element and is retained. The external thread of the threaded section is surrounded by at least one annular outer sealing bead which is an integral part of the threaded section, said sealing bead improving the sealing with respect to the internal thread.

32 Claims, 6 Drawing Sheets

(56) References Cited

U.S. PATENT DOCUMENTS

2006/0061101 A1* 3/2006 Bogdanowicz ......... F16L 41/08
 285/374

FOREIGN PATENT DOCUMENTS

| | | |
|---|---|---|
| DE | 102012021683 A1 | 5/2014 |
| DE | 102014225279 A1 | 6/2016 |
| DE | 102016205621 B3 | 3/2017 |
| EP | 0185802 A1 | 7/1986 |
| EP | 2492523 A1 | 8/2012 |
| FR | 2757442 A1 | 6/1998 |
| GB | 1 550 624 | 8/1979 |
| WO | 2013/020637 A2 | 2/2013 |

* cited by examiner

CONNECTION DEVICE FOR A FLUID LINE AND CORRESPONDING ASSEMBLY METHOD

This application claims priority based on an International Application filed under the Patent Cooperation Treaty, PCT/EP2017/079110, filed on Nov. 14, 2017, which claims priority to DE 10 2016 224 730.1 filed on Dec. 12, 2016.

BACKGROUND OF THE INVENTION

The invention relates to a connection device for a fluid line, with a connection unit which is axially penetrated by an insertion opening into which a fluid line to be connected can be inserted from a rear side, wherein the connection unit comprises a fastening body having a longitudinal axis and having a threaded section with an external thread and with a head section following to the external thread on a rear side, wherein the fastening body supports an annular retaining element arranged coaxially to the insertion opening and having a plurality of retaining claws protruding into the insertion opening, said retaining claws being configured to impinge the outer circumference of the fluid line when inserted in the insertion opening in order to retain the fluid line, wherein the connection unit is able to be inserted with its threaded section into a fastening opening having an internal thread of a separate carrier component and by engaging in the internal thread of this fastening opening the connection unit is able to be fastened to the carrier component for adopting a use position. The invention also relates to a method for assembling such a connection device.

A connection device of this kind known from EP 0 185 802 A1 has a connection unit, containing a fastening body with a screw-type design, with which it can be screwed into a fastening opening of a separate carrier component provided with an internal thread. The connection unit has an axial insertion opening extending axially through it, into which a fluid line to be connected can be inserted from the outside of the rear of the carrier component. A retaining element is secured to the fastening body coaxially to the insertion opening, and has a plurality of retaining claws protruding inwards with a radial slant, which protrude on the front of the main body from the insertion opening. When the fluid line is inserted, the retaining claws are pushed outwards, so that under pretension they rest against the outer circumference of the fluid line and prevent this pulling out from the connection unit. The retaining element is attached from the front to a threaded section of the fastening body, having an external thread matching the internal thread of the carrier component. During assembly, the connection unit is screwed by means of the fastening body into the fastening opening of the carrier component, until a head section of the fastening body axially attached to the threaded section abuts the outer surface of the carrier component and is braced against this.

From DE 10 2012 021 683 A1, a connection device is known having a holding sleeve, consisting of an enveloping body in an elastomer material and a retaining element with slanted retaining claws. In its use position, the holding sleeve is snap-fitted into a fastening opening of a carrier component, wherein it is fastened by means of an annular radial projection configured in the carrier component which engages with an annular groove configured on the outer circumference of the enveloping body.

From GB 1 550 624 a connection device is known, having a sleeve body, in which an annular groove is configured, in which a combination part comprising a resilient retaining element and a sealing element is fastened. The retaining element is partially embedded in the sealing element. The sealing element serves both as a seal against the sleeve body and against an inserted fluid line.

DE 10 2014 225 279 A1 discloses a connection device for a fluid line, having a retaining sleeve, that can be fastened in an internal thread of a fastening opening of a carrier component. A retaining element is part of the retaining sleeve and is provided with retaining claws able to impinge upon the outer circumference of an inserted fluid line, in order to retain this. The retaining element is also provided with a plurality of securing arms, forming engagement projections, lying on a turning line, the slope of which corresponds to the slope of the internal thread. Since the engagement projections engage in the internal thread, they bring about a securing of the retaining sleeve on the carrier component.

In the post-published DE 10 2016 205 621 B3, a connection device for a fluid line is described, having a connection unit, that can be fastened with a threaded section having an external thread of a fastening body in a rubber-elastic material in an internally-threaded fastening opening of a carrier component. A head section is axially attached to the threaded section, and has a larger diameter than this, in which an annular retaining element is fastened. The connection unit has an insertion opening extending through it, in which the fluid line to be connected can be inserted, such that it protrudes through the annular retaining element and is secured by the retaining claws of this retaining element.

SUMMARY OF THE INVENTION

The object of the invention is to provide a connection device for a fluid line which has a cost-effective design that allows a secure retention of the connection unit in the fastening opening of a carrier component. It is also intended to provide a low-cost method of assembly of such a connection device.

To achieve this object, it is provided for a connection device of the abovementioned type, that at least the threaded section of the fastening body is made from a material with rubber-elastic properties, wherein the external thread of the threaded section is surrounded radially outwardly by at least one, in itself closed, annular outer sealing bead configured as an integral part of the threaded section.

The connection device according to the invention contains a connection unit comprising very few parts and which is therefore economical to manufacture. The fastening body has a rubber-elastic threaded section with an external thread, with which it can be fastened in an internal thread of a separate carrier component. In its use position, the connection unit engages via the external thread of the threaded section of its fastening body with the internal thread of the carrier component and is thereby axially anchored with a form-fit in the carrier component. Due to the elasticity of the material, even high production tolerances are compensated for without problems, meaning that the demands on manufacturing precision are relatively low, which has an advantageous effect on production costs. The rubber-elastic material for the threaded section generally guarantees, even without an additional sealing element, a reliable seal both in respect of the carrier component and the inserted fluid line. Here, a particularly advantageous effect is provided by the at least one annular outer sealing bead, which is arranged radially outwards on the external thread of the threaded section and similarly has rubber-elastic properties. This annular outer sealing bead, configured as an in itself closed ring structure and in particular protruding beyond the outer surface of the external thread, deviates from the course of the winding of the external thread and is therefore, in the use position of the connection unit, compressed not only radially but also axially with the profile of the internal thread of the associated fastening opening. This very reliably allows a leakage of a fluid trapped between the connection unit and a carrier component that follows the thread pitch to be prevented. The annular outer sealing bead is in particular integrally positioned on the standard external contour of the external thread, so that it has a slight radial protrusion all around this, creating a particularly strong seal. The external thread and the at least one annular sealing bead are preferably made from coordinated materials, meaning that they preferably comprise the same material. The inserted fluid line is securely fastened by the retaining claws of the retaining element, which expediently protrude with a radially-inward slant into the insertion opening.

Advantageous developments of the invention are indicated by the subclaims.

The annular outer sealing bead is preferably configured in one piece with the external thread of the threaded section. This allows cost-effective production to be achieved directly together with the production of the external thread in a single work step, in particular by injection moulding or another forming method. Expediently, the same material is used here for the external thread and the at least one annular sealing bead. Alternatively, the at least one annular sealing bead can be produced independently of the production of the external thread and attached to the external thread, by way of example by gluing a prefabricated annular body or by over-moulding by means of injection moulding or by vulcanisation onto the external thread produced separately beforehand.

At least one, and preferably each, annular outer sealing bead expediently has a ring-shaped configuration. Preferably, at least one and preferably each annular outer sealing bead is arranged eccentrically to the longitudinal axis of the fastening body. Expediently, at least one and preferably each annular outer sealing bead has an external diameter which is smaller than the nominal diameter of the external thread.

Expediently, the annular outer sealing bead extends in an extension plane referred to, for ease of distinction, as the sealing bead-extension plane. The sealing bead-extension plane preferably has an angular orientation with regard to the longitudinal axis of the fastening body, which deviates from that of a reference plane, which is inclined as a function of the pitch angle of the external thread.

It is considered particularly advantageous if the annular outer sealing bead extends in a sealing bead-extension plane, extending at right-angles to the longitudinal axis of the fastening body. The normal direction of such a sealing bead-extension plane has the same orientation as the longitudinal axis of the fastening body.

Preferably, the threaded section has on its outer circumference a plurality of annular outer sealing beads arranged at an axial distance form one another. This plurality of outer sealing beads preferably extend in sealing bead-extension planes that are parallel to one another. Preferably, more than two such outer sealing beads are present, by way of example three of these. It is not essential, but is expedient, if the plurality of outer sealing beads are arranged in the axial direction of the longitudinal axis of the fastening body at the same distance from one another. The sealing bead-extension planes that are parallel to one another, preferably all run in each case in a radial plane with respect to the longitudinal axis of the threaded section.

The width of the at least one and preferably of each outer sealing bead measured in the longitudinal direction of the fastening body is preferably less than the distance between two thread crests of the external thread arranged immediately adjacent to one another. In this way, the at least one outer sealing bead can be optimally compressed with the profile of the internal thread of the fastening opening of an associated carrier component.

The connection unit can be produced particularly cost-effectively, if the fastening body is configured not only in the region of its threaded section, but in its entirety as one single piece in a material with rubber-elastic properties.

The rubber-elastic material of the threaded section and preferably of the entire fastening body preferably involves an elastomer material in particular. The elastomer material is, by way of example, NBR (Nitrile Butadiene Rubber). The use of a thermoplastic elastomer material (TPE) that can be processed and moulded very successfully by injection moulding has proven particularly expedient.

The annular retaining element is preferably anchored exclusively in the head section, without engaging in the threaded section. This facilitates use of the connection device even with small-diameter fastening openings, because the minimum dimensions of the threaded section are not tied to the dimensions of the retaining element.

With regard to the axial direction of the insertion opening, the retaining element expediently has shorter dimensions than the head section, wherein it is positioned in the head section in such a way that the head section protrudes axially either side of it. The retaining element preferably has a flat disc-shaped configuration.

The head section which in the assembled use position of the connection unit is arranged outside the fastening opening of the carrier component, preferably has a larger external diameter than the threaded section and is attached via an expediently annular graduation to the threaded section. The annular graduation expediently defines a support surface pointing axially forwards in the direction of the threaded section, and preferably annular, which in the use position of the connection unit is configured to support itself on a counter-support surface surrounding the mouth of the fastening opening of the carrier component. At least the end of an assembly process expediently results in a rotational movement of the fastening body, so that its support surface is axially braced against the counter-support surface of the carrier component and secure retention of the fastening body is ensured.

Expediently, the external thread extends exclusively along the threaded section, whereas the head section has no external thread. Externally, the head section expediently has a cylindrical shape, but can also have a polygonal contour and/or at least two flat areas, to allow the application of a suitable operating tool for introducing a torque. Normally, however, due to the rubber elasticity of the fastening body sufficient fixing can be achieved simply by tightening the fastening body by hand.

The external thread of the threaded section can be configured such that it extends over only a partial length of the threaded section. However, it preferably extends over the entire length of the threaded section. The head section is preferably directly attached to the external thread.

The external thread expediently has an uninterrupted, continuous thread. However, a form is also possible in which the external thread is segmented and the thread consists of a plurality of successive thread sections spaced apart from each other.

A particularly cost-effect construction of the retaining element provides that the retaining element consists merely of an annular body and retaining claws integrally connected to the annular body. The retaining element is anchored in the fastening body by means of the annular body, for which reason the annular body can be referred to as an anchoring annular body.

All in all, the retaining element expediently has a one-piece configuration. It comprises in particular a resilient metal, in particular special steel. It is preferably produced by a combined stamping and bending operation, such that what is known as a stamped and bent part results.

The fastening body is expediently an injection-moulded part, which during manufacture by injection moulding, thus during its forming, is directly moulded onto the previously and separately produced retaining element, so that the retaining element is at least partially embedded in the material of the fastening body. This results in a particularly close connection between the fastening body and the retaining element.

The threaded section consisting of a rubber-elastic material can itself directly form a sealing structure that is cost-effective to produce, and which provides a seal between the fastening body and both the carrier component and the inserted fluid line. This allows the fitting of separate sealing elements, in particular O-rings, in the connection device to be dispensed with. The threaded section defines at least one annular outer sealing section for a sealing abutment against the carrier component and furthermore at least one annular inner sealing section sealing the inserted fluid line around its outer circumference. Here, the at least one annular outer sealing bead is a component of the outer sealing section or forms this outer sealing section on its own.

Expediently, the fastening body has on its threaded section at least one annular sealing bead arranged coaxially with respect to the insertion opening, and protruding radially inwards into the insertion opening, provided for a sealed abutment of the outer sealing surface against the inserted fluid line. The at least one annular inner sealing bead is expediently a component of the inner sealing section or forms this inner sealing section on its own. In the non-inserted state of a fluid line, the internal diameter of the insertion opening in the region of the at least one annular inner sealing bead is smaller than the external diameter of the fluid line. In this way, the annular inner sealing bead is elastically deformed when the fluid line is inserted and pressed with a high sealing force against the circumferential surface of the fluid line.

When a fluid line is inserted, the threaded section is expediently radial broadened, so that at least one and preferably each outer sealing bead is also pushed radially outwards and actively compressed with the internal thread of the fastening opening of the carrier component. This results in a reliable seal between the threaded section and the carrier component. At the same time, in this way a friction-type connection between the threaded section and the carrier component is achieved, counteracting rotation and possible loosening of the fastening body. When the fluid line is inserted, the fastening body is therefore also securely fastened in the carrier component, even if the fastening body has first been only tightened with low force and by way of example purely manually.

The at least one annular inner sealing bead is expediently arranged in a radial plane at right-angles to the longitudinal axis of the fastening body. At least one annular inner sealing bead is arranged in the same radial plane as an annular outer sealing bead. In this way, the radial force of pressure exerted by an inserted fluid line on the inner sealing bead is transferred directly and all around the longitudinal axis of the fastening body to the outer sealing bead surrounding it for this purpose, which consequently deforms with very high force radially outwards and is pressed against the internal thread, guaranteeing a particularly reliable seal. Expediently, the rubber-elastic threaded section comprises a plurality of sealing bead pairs each consisting of an inner sealing bead and an outer sealing bead lying in the same radial plane.

Expediently, at least one annular inner sealing bead and preferably each annular inner sealing bead has a sawtooth-like profile and a rear bead flank facing the insertion opening, which with respect to a radial plane at right-angles to the longitudinal axis of the fastening body has a greater incline than a front bead flank of the same inner sealing bead facing away from the insertion opening. This allows an easy insertion with only little force of the fluid line to be connected. The front bead flank preferably runs at least approximately in a radial plane of the threaded section.

The elasticity of the threaded section is in particular high enough for axial insertion of the threaded section in the fastening opening provided with an internal thread even without a screwing operation. This simplifies the assembly process and makes rapid assembly of the connection unit and the carrier component easier. The assembly process is comparable to a repeated latching action.

If it the connection device is intended to offer the possibility of removing an inserted fluid line from the connection unit, as necessary at any time, simply and without damage, the connection unit can expediently be or is fitted with a release sleeve, arranged to displace axially in the fastening body and with a manually operable actuating section protruding from the rear of the fastening body. Inside the fastening body, the release sleeve is axially externally upstream of the retaining claws, so that when the actuating section is pressed it can act on the retaining claws and lift these from the outer circumference of the inserted fluid line.

The release sleeve is expediently retained within the fastening body in a retention groove configured as a radial groove-like widening of the insertion opening. Due to the rubber elasticity of the fastening body, the release sleeve can be very easily latched into place in the retention groove.

The release sleeve is optional. To allow a highly cost-effective implementation of the connection unit, the release sleeve can be dispensed with. Usually, a fluid line can then be inserted and fastened only once and subsequently only removed with destruction of the connection unit. This solution is particularly intended for cases in which once a pipe connection has been created it never has to be disconnected. In a construction with release sleeve, indentations configured in the fastening body for accommodating the release sleeve can be filled with the material of the fastening body, if a variant without release sleeve is implemented. If a release sleeve preferably also has the function of a radial support for the fluid line pushed through, then this radial support function can, in the absence of a release sleeve, be taken on by the correspondingly shaped fastening body.

In the carrier component expediently playing a part on the connection device a fluid channel is preferably configured, which communicates with the fastening opening. Thus, when the fluid line is connected, the duct configured in a fluid line is in fluidic connection with the fluid channel of the carrier component.

The carrier component expediently involves a housing body of a fluid technology component, by way of example of a valve or a fluid actuator. In this way, the connection unit can be very simply mounted directly on a fluid technology component.

A particularly expedient method of assembling the connection device provides for pushing the connection unit with the threaded section of its fastening body under elastic deformation of the external thread and of the at least one outer sealing bead, without a screwing operation, axially into the fastening opening of the carrier component, so that the external thread of the threaded section is in form-fit engagement with the internal thread of the fastening opening of the carrier component and the at least one outer sealing bead is pressed against the internal thread. Only then, in a further assembly step, is the fastening body rotated a little, resulting in a screwing operation, the consequence of which is that the fastening body is axially braced against the carrier component. The axial bracing is in particular the result of the axial pressing of an axially oriented support surface configured on the head section against a counter-support surface of the carrier component coaxial to the fastening opening. Dismantling of the connection unit expediently takes place purely by a screwing operation.

If for the external thread of the threaded section a standardised thread is used, any carrier components, having a fastening opening provided with an internal thread can be fitted or also retrofitted with the connection device.

The carrier component expediently comprises at least in the region of the fastening opening a rigid material, by way of example metal or a plastic material.

In the following the invention is explained in more detail using the attached drawing, wherein:

DETAILED DESCRIPTION OF THE PREFERRED EMBODIMENTS

Figure 1:
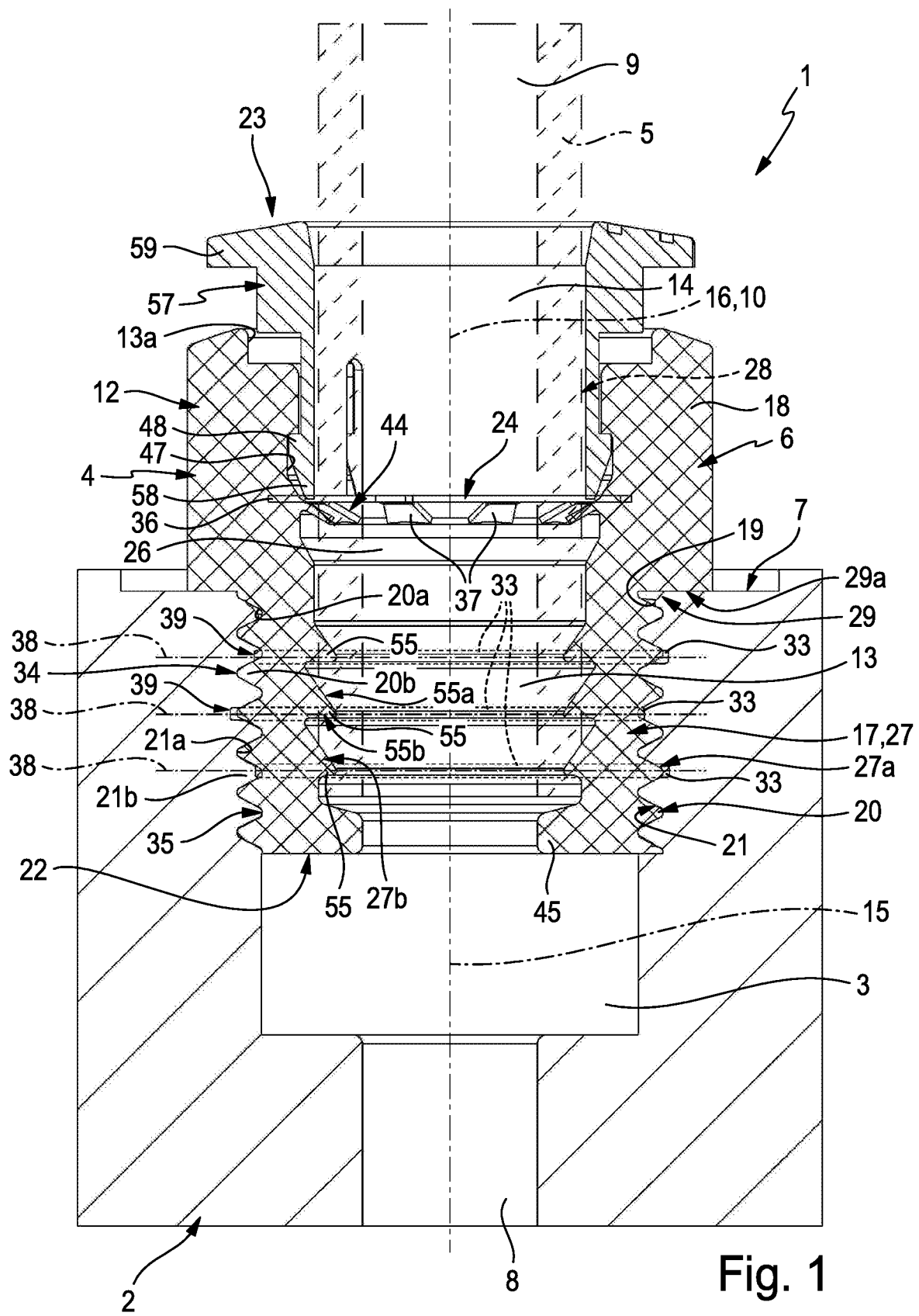
FIG. 1 shows a longitudinal cross section through a preferred embodiment of the connection device according to the invention, wherein the connection unit is shown in its use position employed in a carrier component and a connected fluid line is indicated by a dot-dashed line, wherein annular outer sealing beads configured as an integral part of the rubber-elastic threaded section and protruding beyond the outer surface of the external thread are shown in the non-deformed starting state for the sake of clarity.

The advantageous embodiment illustrated in the drawing of a connection device designated as a whole by reference numeral 1 contains a connection unit 4, which in its use position engages in a fastening opening 3 of a carrier component 2 and is fastened in this fastening opening 3.

The connection device 1 is suitable for connecting a fluid line 5, configured for channelling a fluidic pressurised medium such as compressed air or hydraulic fluid. The connectable fluid line 5 is preferably a flexible hose. Nevertheless, this can also be a rigid pipe. FIG. 1 shows the fluid line 5 in the connected state.

Notwithstanding the exemplary embodiment, the connection unit 4 can form the connection device 1 on its own. The connection unit 4 can be combined with any optional carrier component 2, having a suitably designed fastening opening 3. Thus, in particular, this offers the possibility of fitting or retrofitting existing carrier components 2 with one or more connection units 4 as required.

The connection device 1 is preferably implemented according to the embodiment as a module, comprising at least a connection unit 4 and a carrier component 2, having at least a fastening opening 3 matched to the connection unit 4. Here the connection unit 4 can already be assembled in the factory such that upon delivery it is in its use position on the carrier component 2. Alternatively, the connection unit 4 and carrier component 2 can also be delivered as separate components, which are assembled, that is put together, by the user.

In the illustrated exemplary embodiment, the carrier component 2 is formed by an element of a fluid engineering component such as for example a valve, a fluid actuator or a compressed air maintenance unit. The carrier component 2 is preferably represented by a housing body of such a fluid engineering component, by way of example by a cylinder housing or by a valve housing. The drawing shows the carrier component 2 in a very simplified form.

According to an embodiment of connection device 1 that is not depicted, in addition to the at least one fastening opening 3, the carrier component 2 has a further fastening interface, with which it can be fastened to a fluid engineering component of the abovementioned kind. In this case, the carrier component 2 functions as a link between the connection unit 4 and the fluid engineering component to be equipped with it.

The fastening opening 3 configured in the carrier component 2 like a recess leads with a discharge opening 19 to an outer surface of the carrier component 2, hereinafter referred to as a connection outer surface 7, and has a longitudinal axis 15. In the inside of the carrier component 2, a fluid channel 8 is attached to the fastening opening 3, in particular with a coaxial orientation, with which a duct 9 extending through the fluid line 5 is in fluid connection when the fluid line 5 is connected.

The connection unit 4 has a longitudinal axis 16 and at right-angles to this longitudinal axis 16 has an annular cross section. It has an axially oriented front 22 and a rear side 23 axially opposed to this and is coaxially open, wherein the opening leading on the one hand to the front 22 and on the other to the rear side 23 is referred to as an insertion opening 26. The fluid line 5 to be connected can be inserted from the rear side 23 into the insertion opening 26.

The connection unit 4 is comprised for example two components, a first component with a preferred sleeve-like design and thus referred to as a retaining sleeve 6 and a detachable or non-detachable release sleeve 57 fastened to the retaining sleeve 6, allowing easy detachment of a previously connected fluid line 5. However, the release sleeve 57 is optional and can also be dispensed with, so that the connection unit 4 comprises exclusively the retaining sleeve 6.

The connection unit 4 and as an example its retaining sleeve 6 contain a preferred one-piece fastening body 12 and an annular retaining element 24 fastened to the fastening body 12. The retaining element 24 has a through hole 13 extending coaxially through it, which in the absence of release sleeve 57 forms the insertion opening 26 on its own. The optional release sleeve 57 engages from the rear side 23 in the through opening 13 of the fastening body 12, so that the sleeve opening 14 surrounded by it and extending through axially is oriented coaxially with the through opening 13, in which case, the insertion opening 26 for the fluid line 5 is formed by joining the sleeve opening 14 and the length section of the through opening 13 extending between the release sleeve 57 and the front 22 of the fastening body 12.

The fastening body 12 has a longitudinal axis 10, which expediently coincides with the longitudinal axis 16 of the connection unit 4. In its longitudinal direction defined by the axial direction of the longitudinal axis 10, the fastening body 12 is divided into a plurality of merging sections, wherein it has a threaded section 17 originating from the front 22 and a head section 18 attaching to this at the rear. The fastening body 12 preferably comprises exclusively the threaded section 17 and the head section 18. It is advantageous if the threaded section 17 and the head section 18 are integrally connected to one another, as is the case in the exemplary embodiment illustrated.

The head section 18 expediently has a larger external diameter than the threaded section 17. In this way, the head section 18 is attached to an annular graduation 29 via the threaded section 17 and defines an annular support surface 29a pointing forwards in the direction of the front 22.

On its outwardly-pointing peripheral circumferential surface, the threaded section 17 has an external thread 20. The external thread 20 preferably extends across the entire axial length of the threaded section 17. In any event, it is expedient if the external thread 20 axial extends directly up to the head section 18 and thus only terminates at the annular graduation 29.

The external thread 20 can be any thread type. It is preferably a metric thread, but an inch screw thread is possible.

In a manner known per se, the external thread 20 expediently comprises a helical groove 20a extending about the longitudinal axis 10 and an elevation 20b axially flanking each side of this helical groove 20a and similarly extending helically about the longitudinal axis 16. However, it would be perfectly possible for the external thread 20 to be segmented in the longitudinal direction of the helix.

The fastening opening 3 is provided on its inner peripheral surface with an internal thread 21 matched to the external thread 20 of the fastening body 12 and complementing this. Therefore, the fastening opening 3 can also be referred to as a threaded opening or threaded hole.

The internal thread 21 expediently comprises in a manner known per se a groove 21a extending helically about the longitudinal axis 15 of the fastening opening 3 and an elevation 21b axially flanking each side of this helical groove 21a and similarly extending helically about the longitudinal axis 15.

Figure 5:
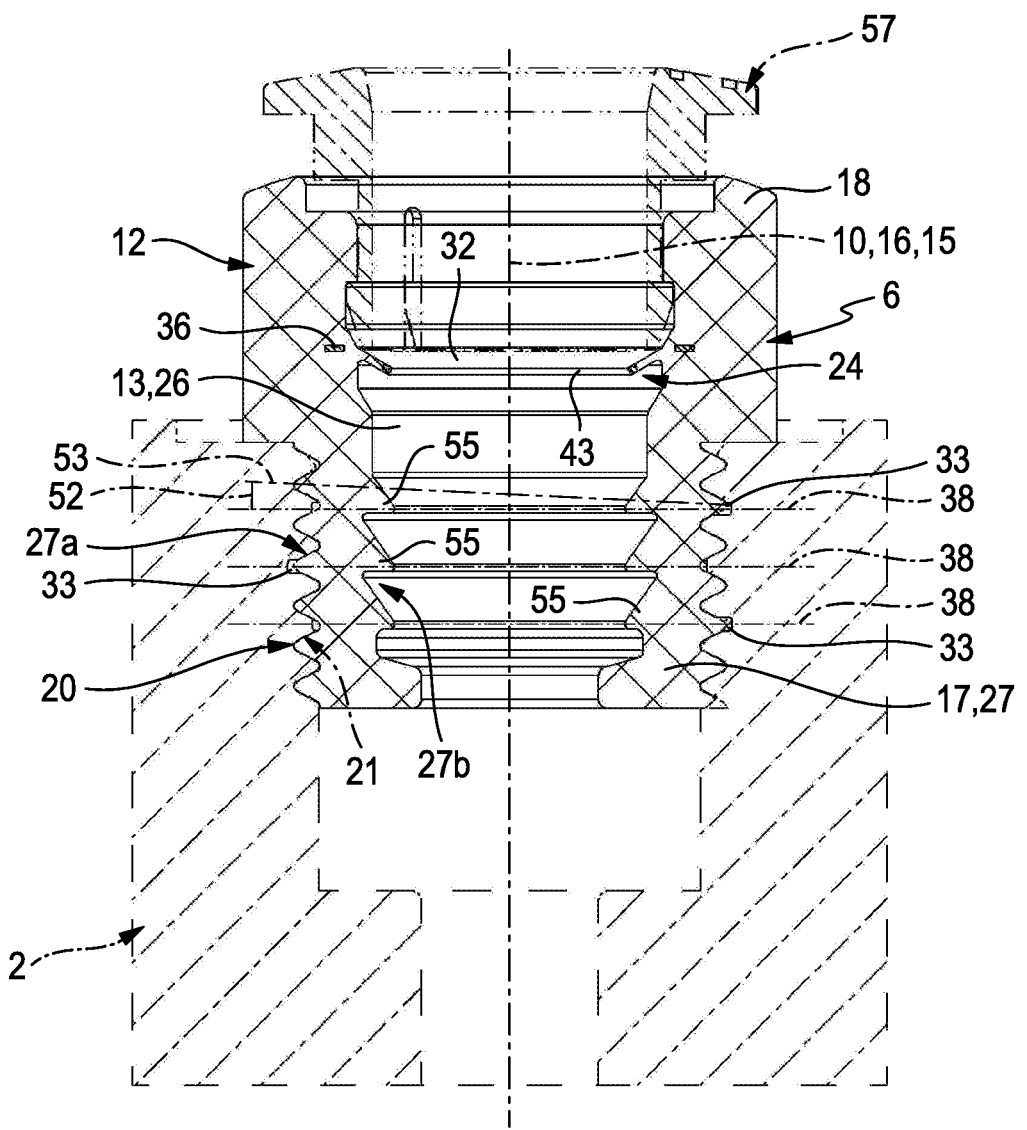
FIG. 5 shows a longitudinal cross section through the connection device, wherein the optional release sleeve and the carrier component are shown only by a dot-dashed line.

In its use position indicated by FIGS. 1 and 5, the connection unit 4 is plunged with the threaded section 17 first into the fastening opening 3, wherein its external thread 20 engages with the internal thread 21. In doing so, the fastening body 12 is screwed to the carrier component 2, in such a way that it abuts with its annular support surface 29a under pretension against the connection outer surface 7 functioning as a counter-support surface. The torque required for pre-tensioning can be introduced via the head section 18 into the fastening body 12.

In the exemplary embodiment, the head section 18 is provided with a cylindrical external contour, so that it can be gripped very easily with the fingers of one hand for tightening. The head section 18 has no external thread and in particular has a smooth configuration, which prevents accumulation of soiling. However, it would be quite possible to provide the peripheral lateral surface of the head section 18 with a plurality of flat areas, which are particularly beneficial when introducing a torque and which in particular offer the possibility of applying a suitable screwdriver.

The fastening body 12 comprises, at least in the region of its threaded section 17, material with rubber-elastic properties. This means that the threaded section 17 and consequently also its external thread 20 are rubber-elastically deformable. Basically, the head section 18 with respect to the threaded section 17 can be an independent component of the fastening body 12, which is fastened by appropriate measures to the threaded section 17, by way of example by a substance-to-substance bond. Notwithstanding this, the fastening body 12 expediently similarly comprises material rubber-elastic properties and in particular the same material as the threaded section 17. The fastening body 12 preferably has a one-piece configuration in material with rubber-elastic properties, such that between the head section 18 and the threaded section 17 an integral connection is present, as is the case in the exemplary embodiment illustrated.

The material responsible for the rubber-elastic properties is preferably an elastomer material and as such in particular a thermoplastic elastomer material. The fastening body 12 is in particular produced by injection moulding from an injection-mouldable plastic material.

The rubber elasticity of the fastening body 12 is preferably selected such that under elastic deformation of the external thread 20 it can be axially pushed without a screwing operation into the fastening opening 3 provided with the internal thread 21. With this axial pushing-in into the fastening opening 3, consecutive latching or snapping operations take place, in which the elevations 20b of the external thread 20 latch or snap into the successive thread sections of the internal thread 21. Thus, mounting of the connection unit 4 with the carrier component 2 can be performed in a very time-saving manner. Only when the fastening body 12 has been inserted in the fastening opening 3 so far that it abuts with its support surface 29a against the counter-support surface of the carrier component 2 formed as an example by the connection outer surface 7, is the fastening body 12 rotated a little further by the introduction of a torque into the head section 18, until the fastening body 12 is axially braced with sufficient strength against the carrier component 2. With this axial bracing, the support surface 29a is braced against the counter-support surface.

As a result of the rubber elasticity of the fastening body 12, the fastening body 12 can also be sufficiently tightened by hand.

Notwithstanding this advantageous assembly possibility, the fastening body 12 can obviously also be conventionally fastened in the fastening opening 3, such that from the outset it is screwed with its external thread 20 into the internal thread 21.

If it is intended that the connection unit 4 will be separated again at some point from the carrier component 2, this can be done, in that through simply introducing a suitably directed torque into the head section 18 of the fastening body 12, it can be unscrewed from the fastening opening 3. With sufficient elasticity of the threaded section 17 and a suitably high tensile force, it is possible for the fastening body 12 to be pulled out of the fastening opening 3 without a screwing operation, at least after the axial bracing has first been removed by rotating the fastening body 12 slightly.

The annular retaining element 24 referred to above is fastened to the fastening body 12 in the coaxial direction with respect to the through opening 13, in particular in a non-detachable manner.

The annular retaining element 24 surrounds an annular opening 32, oriented coaxially to the through opening 13 of the fastening body 12 and consequently also defining a length section of the insertion opening 26. The fluid line 5 inserted in the connection unit 4 also extends through the annular opening 32 of the retaining element.

The retaining element 24 is expediently exclusively anchored in the head section 18 of the fastening body 12 and does not engage in the threaded section 17. Thus, in the assembled use position of the connection unit 4, the annular retaining element 24 is completely outside the fastening opening 3. In this way, the threaded section 17 can be designed without problems for small diameters. This is the case with the illustrated exemplary embodiment.

According to an exemplary embodiment that is not illustrated, the retaining element 24 is anchored in the head section 18, but from there engages in the threaded section 17. In an exemplary embodiment that is similarly not shown, the retaining element 24 is exclusively anchored in the threaded section and in the assembled use position of the connection unit 4 is completely inside the fastening opening 3.

Expediently, the retaining element 24 has shorter dimensions in its axial direction than the head section 18 and is arranged in the head section 18 in such a way that length sections of the head section 18 protrude axially either side of it.

Figure 6:
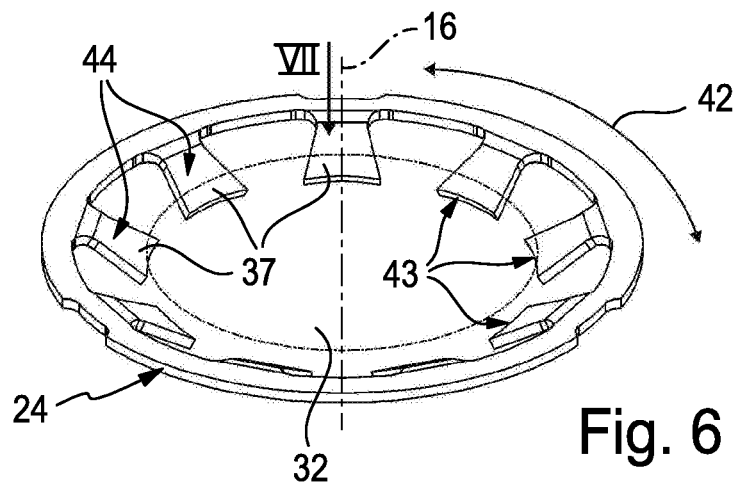
FIG. 6 shows a perspective detailed view of a retaining element used on the connection device of FIGS. 1 to 5.
Figure 7:
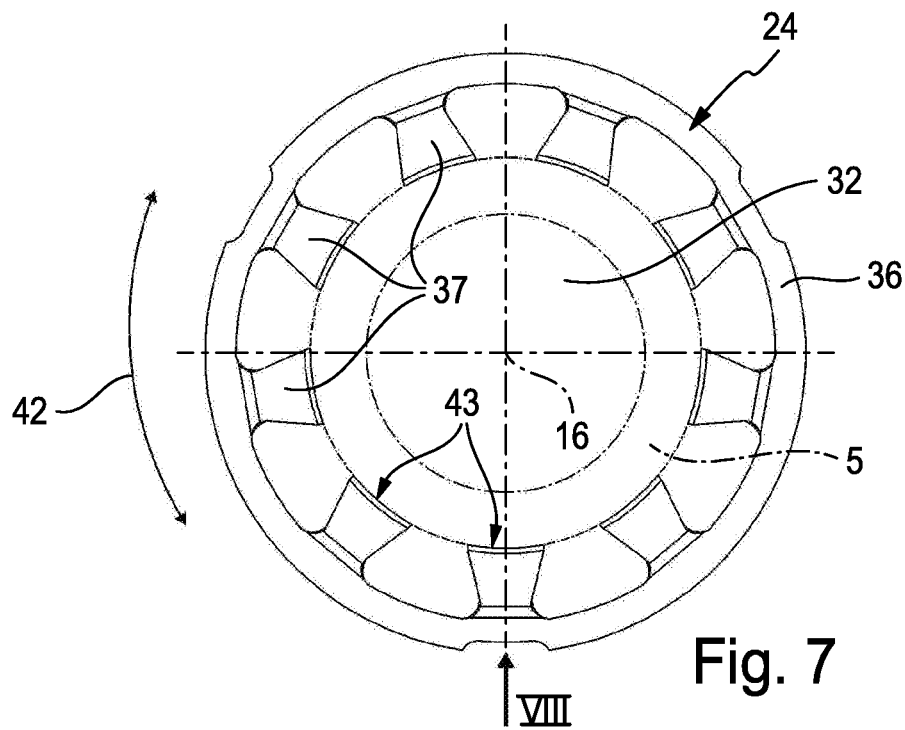
FIG. 7 shows a top view of the retaining element seen in a direction according to arrow VII from FIG. 6.
Figure 8:
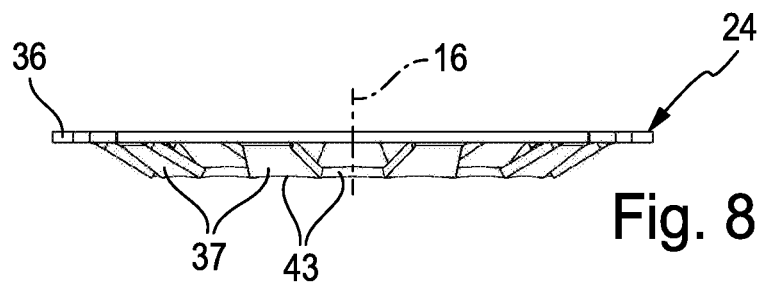
FIG. 8 shows a side view of the retaining element seen in a direction according to arrow VIII from FIG. 7.

The retaining element 24 expediently has an annular section, used for anchoring in the fastening body 12 and is therefore referred to as an anchoring annular body 36. The anchoring annular body 36 has a circumferential direction, identified in FIGS. 6 and 7 at 42 by a double arrow and which refers to the direction about the longitudinal axis 16 of the connection unit 4.

The anchoring annular body 36 supports a plurality of retaining claws 37, arranged distributed on the anchoring annular body 36 in its circumferential direction 42. Between each immediately adjacent retaining claw 37 in the circumferential direction 42 there is expediently a gap. Overall the retaining claws 37 form a circle of retaining claws extending about the longitudinal axis 16.

The retaining claws 37 in each case extend from the anchoring annular body 36 expediently inwards with a radial slant and at the same time axially in the direction of the front 22. Consequently, they each have a slanted rear surface 44, which faces a rear discharge opening 13*a* of the through opening 13 of the fastening body 12. The anchoring annular body 36 is embedded in the fastening body 12 and in the process in particular in the head section 18 of the fastening body 12, wherein expediently both axial front faces and also the radial outside lateral surface of the anchoring annular body 36 are covered by the material of the fastening body 12.

Preferably, the internal diameter of the anchoring annular body 36 at least substantially corresponds to the internal diameter of the length sections of the through opening 13 arranged in the region of the anchoring annular body 36 so that from the retaining element 24 only the retaining claws 37 protrude from radially outwards into the through opening 13.

The retaining element 24 expediently has a one-piece configuration. Its anchoring annular body 36 is preferably unslotted and thus in itself sealed all round. Expediently, the retaining element 24 comprises a resilient metal, in particular a special steel. It can be cost-effectively produced as a stamped and bent part.

The retaining sleeve 6 is in particular created by producing the fastening body 12 by injection moulding and during its forming by injection moulding directly moulding it onto the retaining element 24. In this way, the retaining element 24 is partially embedded into the material of the fastening body 12 and closely surrounded, ensuring a high strength of the connection. Between the material of the fastening body 12 and the surface sections of the retaining element 24 covered by the material of the fastening body 12 there is preferably a solid bond.

In an exemplary embodiment that is not shown, the annular retaining element 24 is snapped into a retaining indentation of the previously separately produced fastening body 12 configured on the inner circumference of the head section 18.

Figure 3:
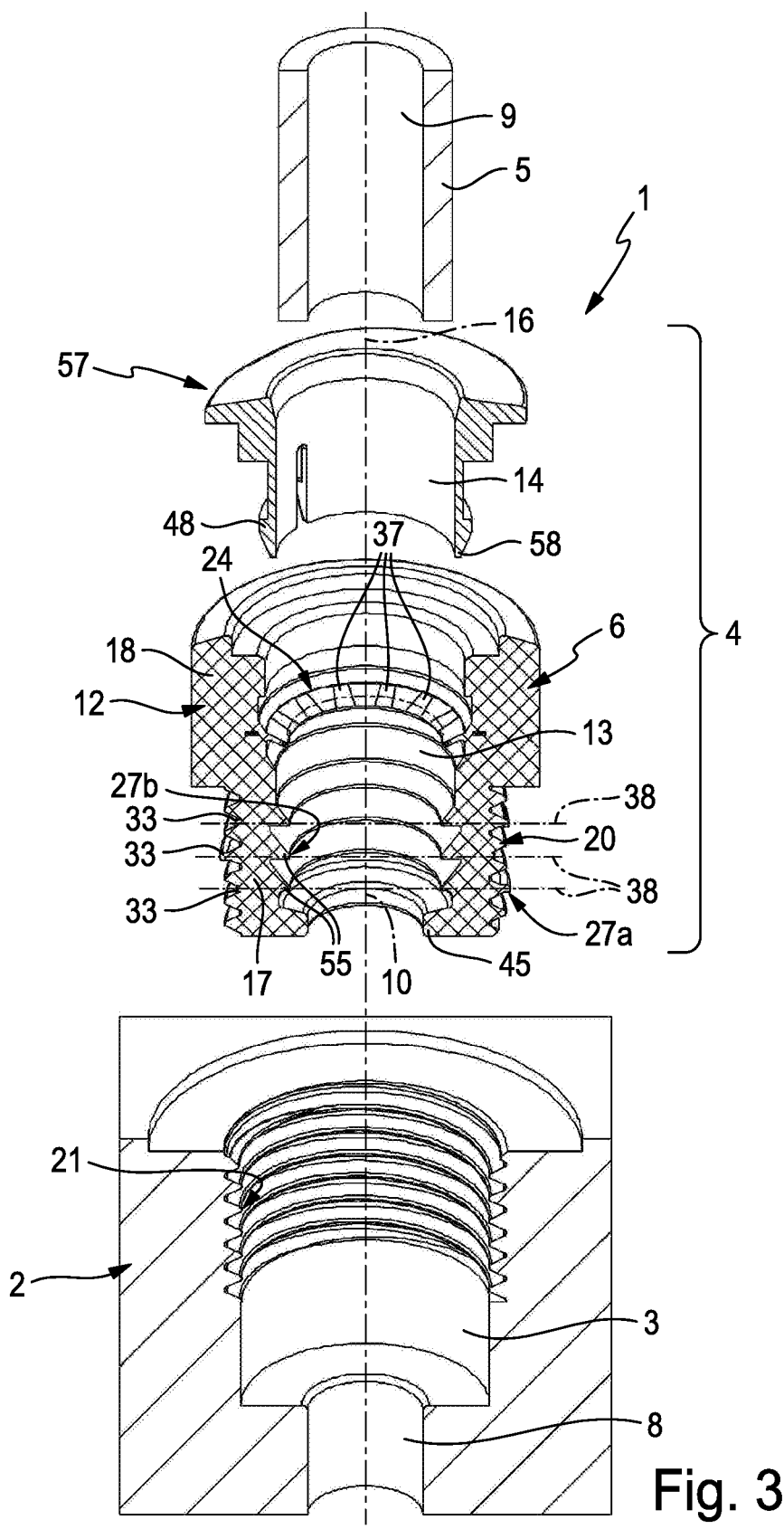
FIG. 3 shows the exploded view from FIG. 2 in a longitudinal cross section.
Figure 4:
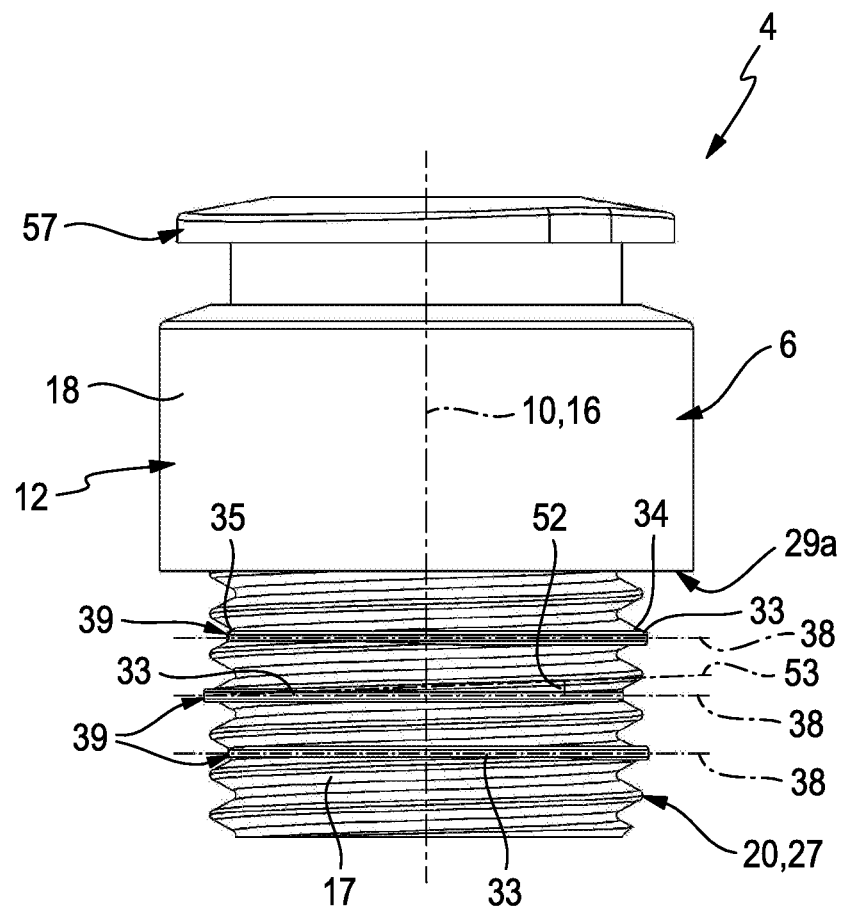
FIG. 4 shows the connection unit individually in side view.

The gaps between retaining claws 37 adjacent to one another in the circumferential direction 42 can be empty. But, they can also be filled with the rubber-elastic material used to produce the fastening body 12, as shown in FIG. 3. Due to the rubber elasticity of this material, the mobility of the retaining claws 37 is not adversely affected by this.

The retaining claws 37 expediently each have a retaining edge 43 opposite the anchoring annular body 36. In the undeformed state of the retaining claws 37, all retaining edges 43 are positioned on a diameter that is smaller than the external diameter of the fluid line 5 to be fastened. To connect a fluid line 5, this is inserted pipe end first from the rear side 23 into the insertion opening 26 and in the process also pushed through the annular opening 32 of the annular retaining element 24. When it is inserted, the leading end face of the fluid line 5 impinges on the slanted rear surface 44 of the retaining claws 37, which thus with the development of a resilient restoring force are swung radially outwards or deformed, so that that they abut with their retaining edges 43 under pre-stressing the circumferential surface 28 of the fluid line 5 and as a function of the material of the fluid line 5 are able to press into or embed in the circumferential surface 28. It is also possible to provide a retention groove on the outer circumference of the fluid line 5, in which the retaining claws 37 are able to latch with their retaining edges 43.

In the preferred exemplary embodiment illustrated, the rubber-elastic threaded section 17 simultaneously forms a sealing structure 27, which in the use position of the connection unit 4 cooperates area by area with the carrier component 2 and similarly area by area with the circumferential surface 28 of the inserted fluid line 5 to provide a seal. In this way, an uncontrolled fluid release from the fastening opening 3 into the environment can be effectively prevented, without the need to use separate sealing elements.

The sealing of the retaining sleeve 6 in relation to the carrier component 2 and the inserted fluid line 5 preferably takes place exclusively by means of the fastening body 12 or by means of the threaded section 17 with its rubber-elastic material that has good sealing properties. This is the case with the preferred exemplary embodiment illustrated. Due to its elastic deformability, the rubber-elastic material can provide optimum adaptation to the circumferential surface 28 of the inserted fluid line 5 and also to the profiled contour of the internal thread 21 of the fastening opening 3 configured in the carrier component 6. For this reason, the connection device 1 is in particular not fitted with one or more additional rubber-elastic sealing elements.

The sealing structure 27 configured by the threaded section 17 preferably has at least one annular outer sealing section 27a cooperating with at least the carrier component 2 to provide a seal, and at least one inner sealing section 27b cooperating with the inserted fluid line 5 to provide a seal.

The outer sealing section 27a is preferably at least in part directly formed by the external thread 20 of the threaded section 17. The thread engagement between the rubber-elastic external thread 20 and the rigid internal thread 21 of the carrier component 2 alone achieves a good seal, preventing passage of fluid between the carrier component 2 and the fastening body 12.

The outer sealing section 27a preferably has at least one annular sealing bead 33 present in addition to the external thread 20, which to allow a better distinction to be drawn is referred to as an outer sealing bead 33 and surrounds the external thread 20. The at least one outer sealing bead 33 is in itself annularly closed.

The at least one annular outer sealing bead 33 is an integral component of the preferably one-piece threaded section 17 in material with rubber-elastic properties. Expediently, during forming of the threaded section 17 it is directly integrally moulded externally onto the external thread 20. Expediently, the external thread 20 and each annular outer sealing bead 33 fastened thereto are made from the same material.

Preferably, the threaded section 17 is provided on its outer circumference with a plurality of such annular outer sealing beads 33, arranged spaced apart in the axial direction of the longitudinal axis 10 of the threaded section 17. In the exemplary embodiment, the external thread 20 is surrounded in each case radially outwardly by a total of three outer sealing beads 33. It is not essential, but is advantageous, if in the event of more than two outer sealing beads 33 being present, the distance between the in each case axially adjacent sealing beads 33 is the same.

Preferably each outer sealing bead 33, in the region of its radially-outwardly directed outer circumference, has a circular cylindrical lateral surface 39. Each outer sealing bead 33 protrudes at the point at which it is positioned beyond the peripheral external contour of the external thread 20, and in particular fully around the external thread 20.

Due to the in itself closed ring structure, the annular outer sealing beads 33 do not follow the helical structure of the external thread 20. This design has the advantageous effect that each outer sealing bead 33, in the use position of the connection unit 4 inserted in the fastening opening 3, is compressed with high intensity radially and axially with the profiled contour of the internal thread 21. This allows effective prevention of pressurised medium in the carrier component 2 and flowing through the connected fluid line 5, by way of example compressed air, escaping into the environment by flowing between the internal thread 21 and the external thread 20 and following the winding of the thread as far as the environment.

At least one and in particular each annular outer sealing bead 33 expediently extends without interruption into a plane which, to allow a better distinction, is referred to as a sealing bead extension plane 38 and which is indicated in the drawing by a dot-dashed line.

At least one and in particular each annular outer sealing bead 33 preferably has a circular configuration. This is the case with the illustrated exemplary embodiment.

Expediently, at least one and in particular each annular outer sealing bead 33 has an external diameter, which is smaller than the nominal diameter, meaning the maximum external diameter of the external thread 20. This is also the case with the illustrated exemplary embodiment.

Preferably, each annular outer sealing bead 33 is arranged eccentrically to the longitudinal axis 10 of the fastening body 17, meaning that its centre is preferably radially spaced from the longitudinal axis 10 of the fastening body 17. This is also the case with the illustrated exemplary embodiment.

Figure 2:
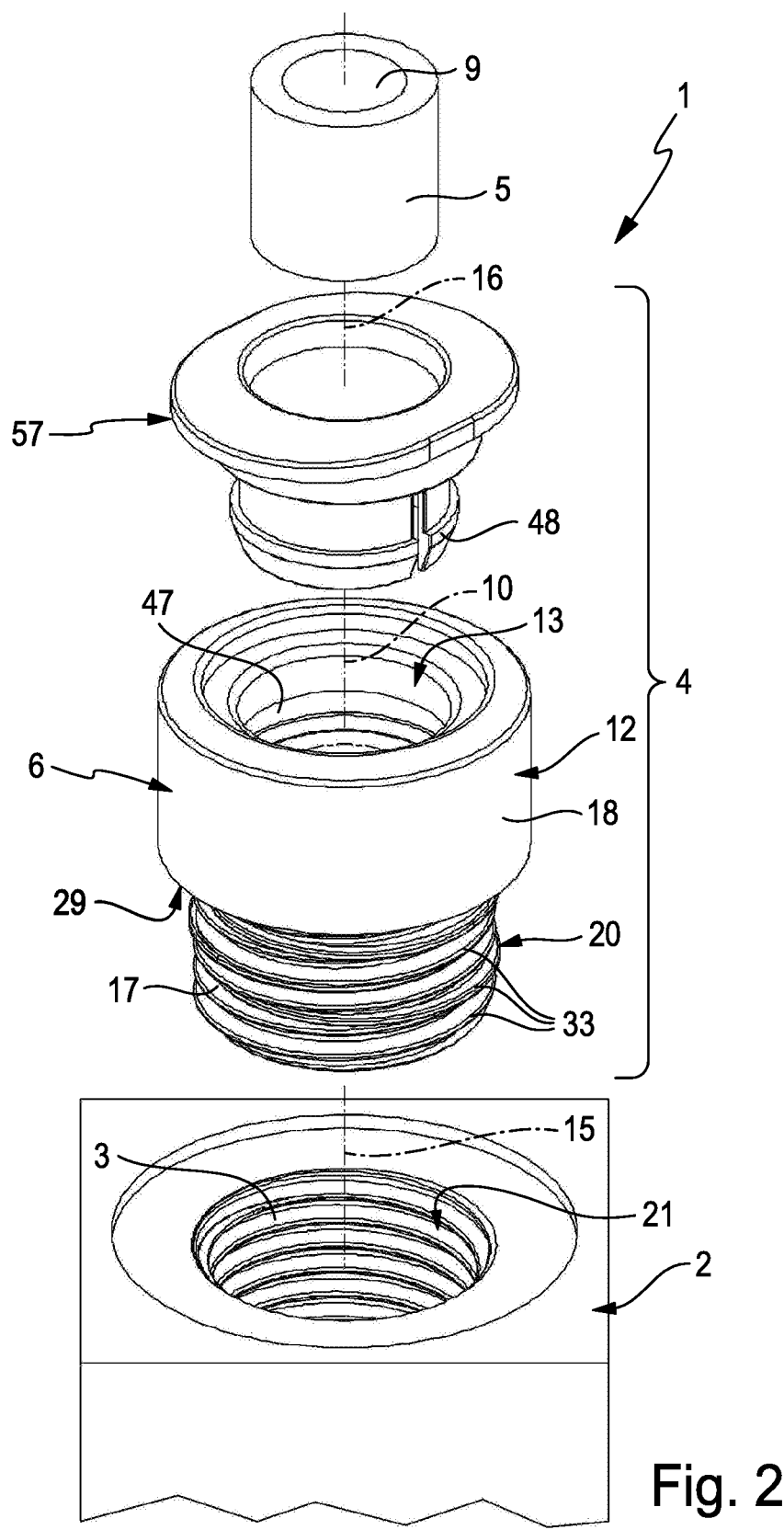
FIG. 2 shows the arrangement from FIG. 1 in a perspective exploded view.

As clearly indicated in particular in FIGS. 1, 2 and 5, the in itself closed ring structure of the outer sealing beads 33 has the effect that for each of these outer sealing beads 33 the measured radial distance from the longitudinal axis 10 of the region of the external thread 20, in which the outer sealing bead 33 is moulded onto the external thread 20, changes around the external thread 20, wherein in particular it continually changes. In particular, a configuration exists such that the outer sealing bead 33 has a sealing bead section, with which it is arranged on the tip of an elevation 20b, referred to in the following as a thread crest 34, of the external thread 20, and a further sealing bead section spaced apart from this in the circumferential direction of the external thread 20, arranged in a trough of the external thread 20 of a groove 20a referred to as a thread trough 35. These two sealing bead sections are preferably diametrically opposed to one another with respect to the longitudinal axis 10. Between these two sealing bead sections the outer sealing bead 33 runs along at least one flank of one of the elevations 20b.

If a plurality of outer sealing beads 33 is present, it is advantageous if the sealing bead sections of this plurality of outer sealing beads 33, which in each case are arranged on a thread crest 34, are spaced apart from each other in the circumferential direction of the threaded section 17, in particular with an even distribution. If three annular outer sealing beads 33 are present, as is the case in the preferred exemplary embodiment, the sealing bead sections associated with the thread crests 34 are expediently arranged at angular distances of 120° to each other. If, by way of example, only two annular outer sealing beads 33 are present, the sealing bead sections associated with the thread crests 34 are expediently arranged at an angular distance of 180° to each other, meaning that they are in diametrically opposed external regions of the external thread 20.

Each annular outer sealing bead 33 preferably extends in a sealing bead-extension plane 38, which with respect to the longitudinal axis 10 of the fastening body 17 has an angular orientation, deviating from that of a reference plane 53, running along the pitch angle 52 of the outer thread 20. The pitch angle 52 is the angle between the helix of the external thread developed in one plane and a radial plane perpendicular to the longitudinal axis 10 of the fastening body 12.

It has proven particularly advantageous to place the sealing bead extension plane 38 in a radial plane extending perpendicularly to the longitudinal axis 10 of the fastening body 12. This is the case with the illustrated exemplary embodiment. Here, the annular outer sealing beads 33 each run in a sealing bead-extension plane 38, oriented at right-angles to the longitudinal axis 10 of the fastening body 12.

Since the outer sealing bead 33 protrudes locally beyond the standard external contour of the external thread 20, in the use position of the connection unit 4 inserted in the fastening opening 3 it is highly compressed and pushed against the contour of the internal thread 21. For the sake of clarity, in FIGS. 1 and 5, the outer sealing beads 33 are shown in their undeformed state. In actual fact, in the assembled state of the fastening body 12 they are located inside the thread profile surrounded by the internal thread 21.

It has proven advantageous to select the width measured in the longitudinal direction of the fastening body 12 of at least one and preferably each outer sealing bead 33 so that it is smaller than the size of the distance measured in the same direction between two immediately adjacently arranged thread crests 34 of the external thread 20.

Preferably, additional special measures are taken the effect of which is that the external thread 20 and the at least one annular outer sealing bead 33 surrounding the external thread 20 is actively pressed radially outwards and in this way radially braced particularly strongly with the internal thread 21 of the fastening opening 3. On the one hand this increases the tightness further and on the other it ensures a frictional connection between the two threads 20, 21, preventing an unintentional release of the threaded joint between the fastening body 12 and the carrier component 2.

The special measures consist in that the threaded section 17 of the fastening body 12 on its inner circumference radially delimiting the through opening 13 has at least one coaxially arranged, radial inward-protruding annular inner sealing bead 55. This sealing bead 55 is a one-piece component of the threaded section 17. It protrudes radially inwards with respect to axially adjacent regions of the fastening body 12 and in the tension-free state delimits an internal diameter which is smaller than the external diameter of the fluid line 5 to be connected. The inner sealing bead 55 is radially deformed by the fluid line 5 inserted and its internal diameter is broadened so that due to the elastic restoring force that is generated it abuts with prestressing and an optimum seal the circumferential surface 28 of the fluid line 5.

However, the radial deformation of the at least one inner sealing bead 55 also leads to at least the length section of the threaded section 17 and of the length section of the length of the external thread 20 attached thereto having the inner sealing bead 55, being elastically pressed radially outwards, resulting in the abovementioned radial bracing between the external thread 20 and the internal thread 21. Furthermore, in doing so, at least one outer sealing bead 33 and preferably each outer sealing bead 33 is impinged upon radially inwards and pushed radially outwards against the contour of the internal thread 21.

Thus, as a direct result of the inserted fluid line 5 the fastening body 12 experiences a strengthening of its fastening force and the sealing effect in the fastening opening 3.

If subsequently the fluid line 5 is removed from the connection unit 4 again, then the fastening forces associated with the inserted fluid line 5 are reduced again, so that the retaining sleeve 6 if necessary can be unscrewed with relative ease from the fastening opening 3 or even pulled out.

The at least one annular inner sealing bead 55 expediently forms the abovementioned inner sealing section 27b.

The at least one sealing bead 55 is preferably positioned in such a way that there is a distance from it to both the head section 18 and the front face of the fastening body 12 located on the front 22.

Preferably, at least one annular inner sealing bead 55 is arranged in the same radial plane 38 at right-angles to the longitudinal axis 10 as an outer sealing bead 33. This has the advantageous effect that the radial deformation of the inner sealing bead 55 brought about by inserting a fluid line 5 impinges directly on and all around the outer sealing bead 33 surrounding this inner sealing bead 55, which as a result is pushed radially outwards with particularly high compressive force. Thus, the outer sealing bead 33 is compressed particularly intensively with the contour of the internal thread 21 receiving the threaded section 17.

It is considered particularly advantageous if each outer sealing bead 33 is associated with its own inner sealing bead 55. In this way each outer sealing bead 33 is specifically radially impinged upon by an inner sealing bead 55, if the fluid line 5 is inserted in the through opening 13 of the fastening body 12. A corresponding configuration exists in the illustrated exemplary embodiment.

The profiling of the inner sealing beads 55 is essentially optional. By way of example, they may have a rounded surface on the inside facing the through opening 13. A design configured by the exemplary embodiment is considered particularly advantageous, in which at least one annular inner sealing bead 55 and preferably each annular inner sealing bead 55 has a sawtooth-like profile and a rear bead flank 55a facing the insertion opening 26, which with respect to a radial plane at right-angles to the longitudinal axis 10 has a greater slope than a front bead flank 55b of the same inner sealing bead 55 facing away from the insertion opening 26.

This profiling of the inner sealing beads 55 is associated with the advantageous effect that the inner sealing beads 55 during axial insertion of a fluid line 5 easily deform radially elastically, such that a fluid line 5 can be connected with relatively little force. When inserted in the connection unit 4, the front face of the fluid line 5 comes up against the axially successively arranged rear bead flanks 55a one after another, along which it slides, wherein the inner sealing bead 55 concerned is pushed radially outwards.

Preferably, the threaded section 17 also contains a radially-inward projecting annular stop collar 45, which is an integral component of the threaded section 17 and accordingly also comprises a material with rubber-elastic properties. When a sealing bead 55 is present, this stop collar 45 is closer to the front 22 of the connection unit 4 than this at least one sealing bead 55.

The annular stop collar 45 delimits a free cross section, the diameter of which is smaller than the external diameter of the fluid line 5 to be connected and which is preferably small enough that the fluid line 5 cannot be pushed through it, even if it is pushed with relatively high force into the connection unit 4. Thus, the stop collar 45 defines the maximum insertion depth of the fluid line 5. The free cross section surrounded by the stop collar 45 is expediently smaller than that which is surrounded by the at least one sealing bead 55. The free cross section surrounded by the stop collar 45 preferably corresponds at least substantially to the cross section of the duct 9.

The stop collar 45 is expediently configured directly on the front 22 of the threaded section 17.

If it is intended for it to be possible to easily remove an inserted fluid line 5 again, there is the possibility of providing the connection device 1 with the release sleeve 57 already mentioned above.

The release sleeve 57 extends coaxially into the fastening body 12, into the through opening 13 of which it protrudes coaxially from the rear side 23. A front end section 58 of the release sleeve 57 terminates axially with respect to the rear surfaces 44 of the retaining claws 37, while a rear actuating section 59 of the release sleeve 57 protrudes axially in the region of the rear side 23 from the retaining sleeve 6. During the connection operation, the fluid line 5 is also pushed through the release sleeve 57. To release the fluid line 5 a force of pressure can be applied to the actuating section 59 of the release sleeve 57 in the forwards direction, so that the release sleeve 57 is shifted in the direction of the retaining element 24 and its front end section 58 pushes against the rear surfaces 44 of the retaining claws 37. In this way, the retaining claws 37 are bent radially outwards under elastic deformation and raised from the circumferential surface 28 of the inserted fluid line 5, which can then be comfortably withdrawn.

In the exemplary embodiment, the release sleeve 57 is fastened in a particularly easy manner to the retaining sleeve 6. The fastening body 12 has in the head section 18, within the length section of the through opening 13 extending into it, a circular groove-like broadening referred to as a retention groove 47. On its length section protruding into the through opening 13, the release sleeve 57 has at least one radially-outward protruding retaining projection 48, preferably with a circular configuration and the axial length of which is preferably less than that of the retention groove 47.

The retention groove 47 is expediently located in the length section of the through opening 13 extending between the retaining element 24 and the rear discharge opening 13a.

The retaining projection 48 engages radially inwardly in the retention groove 47, wherein the abovementioned mutual lengthways matching ensures the axial relative movement between the release sleeve 57 and the retaining sleeve 6 necessary for the release operation. By engaging in the retention groove 47, the retaining projection 48 also ensures that the release sleeve 57 is captively retained on the fastening body 12 and cannot fall out via the through opening 13.

Fitting the release sleeve 57 in the retaining sleeve 6 is greatly facilitated by the rubber elasticity of the head section 18. For the purposes of a simple latching process, the release sleeve 57 can be pushed in axially from the rear side 23 into the through opening 13, wherein the material of the head section 18 is elastically deformed by the retaining projection 48, until the latter finally snaps into the retention groove 47. The reverse sequence of movements allows the release sleeve 57 to be very easily removed again at any time in this way from the retaining sleeve 6. Thus, the user of the connection device 1 has the advantageous possibility of fitting a release sleeve 57 if necessary to the retaining sleeve 6 without using a tool.

If the use of the connection unit 4 does not require that a connected fluid line 5 can be removed again, the release sleeve 57 can be dispensed with. In an embodiment of the connection unit 4 not illustrated, no release sleeve 57 is present, wherein expediently the measures present in the illustrated exemplary embodiment for mounting and/or fastening the release sleeve 57 do not need to be taken. Therefore, the retention groove 47 in particular can be dispensed with. Preferably, the through opening 13 in the length section of which, in the illustrated exemplary embodiment, a release sleeve 57 is located, is deformed such that its internal diameter is only slightly bigger than the external diameter of the fluid line 5, so that in the inserted state the latter experiences radial support by the head section 18.

Self-evidently, a connection unit 4 having no release sleeve 57 can also be created by means of a fastening body 12, the design of which corresponds to that of the illustrated exemplary embodiment.

The invention claimed is:

1. A connection device for a fluid line, with a connection unit which is axially penetrated by an insertion opening into which a fluid line to be connected can be inserted from a rear side, wherein the connection unit comprises a fastening body having a longitudinal axis and having a threaded section with an external thread and a head section following to the external thread on a rear side, wherein the fastening body supports an annular retaining element arranged coaxially to the insertion opening and having a plurality of retaining claws protruding into the insertion opening, said retaining claws being configured to impinge the outer circumference of the fluid line when inserted into the insertion opening in order to retain the fluid line, wherein the threaded section of the connection unit is able to be inserted into a fastening opening having an internal thread of a separate carrier component and by engaging in the internal thread of this fastening opening the connection unit is able to be fastened to the carrier component for adopting a use position, and wherein at least the threaded section of the fastening body is made from a material with rubber-elastic properties, wherein the external thread of the threaded section is surrounded radially outwardly by at least one annular outer sealing bead configured as an integral part of the threaded section.

2. The connection device according to claim 1, wherein the at least one annular outer sealing bead is made in one piece with the external thread of the threaded section.

3. The connection device according to claim 1, wherein the least one annular outer sealing bead is arranged eccentrically to the longitudinal axis of the fastening body.

4. The connection device according to claim 1, wherein the annular outer sealing bead extends in a sealing bead-extension plane having an angular orientation with regard to the longitudinal axis of the fastening body, which deviates from that of a reference plane, which follows the pitch angle of the external thread.

5. The connection device according to claim 1, wherein the annular outer sealing bead extends in a sealing bead-extension plane, involving a radial plane at right-angles to the longitudinal axis of the fastening body.

6. The connection device according to claim 1, wherein on its outer circumference, the threaded section has a plurality of annular outer sealing beads arranged at an axial distance from one another.

7. The connection device according to claim 6, wherein the annular outer sealing beads are arranged at the same distance from one another.

8. The connection device according to claim 1, wherein a width measured in the longitudinal direction of the fastening body of the at least one outer sealing bead is less than a distance between two thread crests arranged immediately adjacent to one another of the external thread.

9. The connection device according to claim 1, wherein the fastening body as a whole is made as one piece in a material with rubber-elastic properties.

10. The connection device according to claim 1, wherein the rubber-elastic material is an elastomer material.

11. The connection device according to claim 10, wherein the rubber-elastic material is a thermoplastic elastomer material.

12. The connection device according to claim 1, wherein the annular retaining element is anchored exclusively in the head section of the fastening body without engaging in the threaded section.

13. The connection device according to claim 12, wherein the retaining element overall has shorter axial dimensions than the head section of the fastening body and is fastened in the head section with an axial distance from the threaded section, such that the head section protrudes axially on either side of the fastening body.

14. The connection device according to claim 1, wherein the head section has a larger external diameter than the threaded section and adjoins to the threaded section via an annular graduation.

15. The connection device according to claim 14, wherein the annular graduation defines a support surface pointing axially forwards in the direction of the threaded section, which, in the use position of the connection unit, is configured to support against a counter-support surface surrounding the mouth of the fastening opening of the carrier component.

16. The connection device according to claim 1, wherein the head section has at least one of the following features: is configured without an external thread; has a cylindrical external contour.

17. The connection device according to claim 1, wherein the external thread of the threaded section extends axially until just before the head section.

18. The connection device according to claim 1, wherein the retaining element has an anchoring annular body embedded in the fastening body coaxially to the insertion opening, wherein the retaining claws are integrally arranged on the anchoring annular body, by protruding radially inwards with a slant.

19. The connection device according to claim 1 wherein the retaining element overall has a one-piece configuration, wherein the retaining element comprises a spring elastic material.

20. The connection device according to claim 1, wherein the fastening body is an injection-moulded part, which during manufacture by injection moulding is directly moulded onto the retaining element.

21. The connection device according to claim 1, wherein the rubber-elastic threaded section forms a sealing structure, said sealing structure having at least one outer sealing section and at least one inner sealing section, wherein the at least one outer sealing section is provided to sealingly abut the carrier component in the use position and comprises the at least one outer sealing bead, and wherein the at least one inner sealing section sealingly surrounds the inserted fluid line on the circumferential surface of the fluid line.

22. The connection device according to claim 1, wherein the threaded section has at least one annular inner sealing bead arranged coaxially to the insertion opening and protruding radially inwards into the insertion opening, provided for sealing abutment against the circumferential surface of the inserted fluid line.

23. The connection device according to claim 22, wherein at least one annular inner sealing bead is arranged to be pushed radially outwards by the inserted fluid line, whereby in addition at least one annular outer sealing bead is pushed radially outwards, in order, in the use position of the connection unit, to be compressed with the internal thread of the carrier component by providing a seal.

24. The connection device according to claim 22 wherein at least one annular inner sealing bead is arranged in the same radial plane as an outer sealing bead.

25. The connection device according to claim 22, wherein at least one annular inner sealing bead has a sawtooth-like profile and has a rear bead flank facing the insertion opening, which with respect to a radial plane at right-angles to the longitudinal axis of the fastening body has a greater incline than a front bead flank of the inner sealing bead facing away from the insertion opening.

26. The connection device according to claim 1, wherein the threaded section of the fastening body is configured to be elastically deformable such that in order to fasten the connection unit in the use position, the threaded section can be pushed under elastic deformation of the external thread and of the at least one outer sealing bead without a screwing operation axially into the internal thread of the fastening opening of the carrier component.

27. The connection device according to claim 1, wherein, in the fastening body, a release sleeve for a release operation of the retaining claws is movably supported, wherein the release sleeve protrudes out of the fastening body at the rear side of the fastening body with an actuating section.

28. The connection device according to claim 27, wherein the release sleeve latches in a retention groove configured in the head section.

29. The connection device according to claim 1, wherein the carrier component is part of the connection device.

30. The connection device according to claim 29, wherein the carrier component is part of the connection device, wherein the carrier component is a housing body of the connection device, in which a fluid channel is configured which is in communication with the fastening opening.

31. The connection device according to claim 1, wherein the least one annular outer sealing bead has at least one of a circular configuration and an external diameter, which is smaller than a nominal diameter of the external thread.

32. A method for assembling a connection device for a fluid line, wherein the connection device comprises a connection unit which is axially penetrated by an insertion opening into which a fluid line to be connected can be inserted from a rear side, wherein the connection unit comprises a fastening body having a longitudinal axis and having a threaded section with an external thread and a head section following to the external thread on a rear side, wherein the fastening body supports an annular retaining element arranged coaxially to the insertion opening and having a plurality of retaining claws protruding into the insertion opening, said retaining claws being configured to impinge the outer circumference of the fluid line when inserted into the insertion opening in order to retain the fluid line, wherein the threaded section of the connection unit is able to be inserted into a fastening opening having an internal thread of a separate carrier component and by engaging in the internal thread of this fastening opening the connection unit is able to be fastened to the carrier component for adopting a use position, wherein at least the threaded section of the fastening body is made from a material with rubber-elastic properties, wherein the external thread of the threaded section is surrounded radially outwardly by at least one annular outer sealing bead configured as an integral part of the threaded section wherein, in a first assembly step: the connection unit is pushed axially into the fastening opening of the carrier component without a screwing operation with the threaded section of the fastening body under elastic deformation of both the external thread and the at least one outer sealing bead, so that the external thread of the threaded section is in form-fit engagement with the internal thread of the fastening opening of the carrier component and the at least one outer sealing bead is pressed against the internal thread, and wherein, in a further assembly step, the fastening body is rotated to perform a screwing operation relative to the carrier component, until the fastening body is axially braced against the carrier component.

* * * * *